United States Patent
Grosso

(10) Patent No.: US 10,554,533 B2
(45) Date of Patent: *Feb. 4, 2020

(54) TESTING OF COMMUNICATIONS EQUIPMENT

(71) Applicant: Telefonaktiebolaget LM Ericsson (publ), Stockholm (SE)

(72) Inventor: Renato Grosso, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/442,530

(22) Filed: Jun. 16, 2019

(65) Prior Publication Data

US 2019/0306047 A1    Oct. 3, 2019

Related U.S. Application Data

(63) Continuation of application No. 14/786,966, filed as application No. PCT/EP2013/058629 on Apr. 25, 2013, now Pat. No. 10,333,818.

(51) Int. Cl.
*H04L 12/26* (2006.01)
*H04L 12/12* (2006.01)

(52) U.S. Cl.
CPC ............. *H04L 43/50* (2013.01); *H04L 12/12* (2013.01); *H04L 43/087* (2013.01); *H04L 43/0858* (2013.01); *H04L 43/0888* (2013.01); *H04L 43/16* (2013.01); *H04L 43/0835* (2013.01); *Y02D 50/40* (2018.01)

(58) Field of Classification Search
CPC . H04L 43/50; H04L 43/0888; H04L 43/0858; H04L 12/12; H04L 43/16; H04L 43/087; H04L 43/0835; Y02D 50/40
See application file for complete search history.

(56) References Cited

U.S. PATENT DOCUMENTS

| 6,308,065 B1 * | 10/2001 | Molinari ............... H04W 24/00 455/423 |
| 2005/0076238 A1 | 4/2005 | Ormazabal et al. |
| 2006/0129870 A1 * | 6/2006 | Parent ................. G06F 11/3688 714/1 |
| 2006/0221843 A1 | 10/2006 | Cidon et al. |

(Continued)

FOREIGN PATENT DOCUMENTS

WO    2014053166 A1    4/2014

OTHER PUBLICATIONS

PCT International Search Report, dated Mar. 20, 2014, in connection with International Application No. PCT/EP2013/058629, all pages.

(Continued)

*Primary Examiner* — Hashim S Bhatti
(74) *Attorney, Agent, or Firm* — Leffler Intellectual Property Law, PLLC

(57) ABSTRACT

A method of testing communications equipment comprises providing to the communications equipment a test traffic load which varies with time to a different level of test traffic load. The method also comprises measuring one or more parameter which characterizes the communications equipment in handling a transition of the test traffic load to the different level.

13 Claims, 9 Drawing Sheets

(56) References Cited

U.S. PATENT DOCUMENTS

| | | | |
|---|---|---|---|
| 2008/0010523 A1* | 1/2008 | Mukherjee | G06F 11/3414 714/25 |
| 2008/0151752 A1 | 6/2008 | Evans | |
| 2009/0106571 A1* | 4/2009 | Low | G06F 9/4856 713/310 |
| 2010/0246415 A1* | 9/2010 | Nishi | H04L 43/50 370/248 |
| 2011/0035753 A1* | 2/2011 | Palczak | G06F 11/3688 718/104 |
| 2011/0208875 A1* | 8/2011 | Hasson | G06F 1/3203 709/238 |
| 2013/0143580 A1* | 6/2013 | Michel | H04W 52/0206 455/446 |

OTHER PUBLICATIONS

ATIS-0600015.02.2009, Energy Efficiency for Telecommunication Equipment: Methodology for Measurement & Reporting—Transport Requirements, Alliance for Telecommunications Industry Solutions, Washington DC, 2009, 31 pages.

ETSI ES 203 215, v1.21.1 (Oct. 2011), Environmental Engineering (EE); Measurement Methods and Limits for Power Consumption in Broadband Telecommunication Networks Equipment, 23 pages.

Network and Telecom Equipment—Energy and Performance Assessment; Metrics, Test Procedure and Measurement Methodology, Draft 3.0.1, Dec. 14, 2010, 32 pages.

R. Bolla et al., Evaluating the Energy-Awareness of Future Internet Devices, 8 pages.

Verizon NEBS Compliance: TEEER Metric Quantification, Verizon Technical Purchasing Requirements, VZ.TPR.9207, Issue 1, Jan. 2009, 10 pages.

Verizon NEBS Compliance: Energy Efficiency Requirements for Telecommunications Equipment, Verizon Technical Purchasing Requirements, VA.TPR.9205, Issue 5, Oct. 2011, 22 pages.

Draft ES 203 184 V0.0.7 (Jul. 2012), Environmental Engineering (EE); Measurement Methods for Power Consumption in Transport Telecommunication Networks Equipment; 20 pages.

Draft ITU Telecommunication Standardization Sector, Study Period 2009-2012, COM 5-Cxx-E, Mar. 2012; Study Group 5—Contribution; Ericsson, Huawei, Telecom Italia; Draft recommendation L.m&m; 30 pages.

International Preliminary Report on Patentability dated Mar. 20, 2014 in connection with International Application No. PCT/EP2013/058629, 8 pages.

* cited by examiner

TESTING OF COMMUNICATIONS EQUIPMENT

CROSS-REFERENCE TO RELATED APPLICATIONS

This application claims the benefit of U.S. application Ser. No. 14/786,966 filed Oct. 23, 2015 (371(c) date), which is a 35 U.S.C. § 371 national stage of international application PCT/EP2013/058629 filed Apr. 25, 2013. All of these earlier applications are hereby incorporated herein by reference in their entireties.

TECHNICAL FIELD

The present invention relates to a method of testing of communications equipment and a testing apparatus configured to test communications equipment.

BACKGROUND

Some communications equipment can operate in more than one power management mode. The power management mode determines the power consumption, and is selected to reduce power consumption. As mentioned in ATIS-0600015.02.2009, for transport equipment, the energy efficiency can be determined from the power consumption according to:

Telecommunications Energy Efficiency Ratio
(TEER)=data throughput/power consumption The power consumption of communications equipment can be tested at different traffic loads, e.g. three different traffic loads. For example, the power consumption is separately measured when the equipment is handling a traffic load of 100%, 50% and 0% of a maximum throughput. An average of different levels can be calculated.

This measure of energy efficiency considers only particular discrete traffic loads, e.g. only three different traffic loads. Thus, the testing does not fully replicate conditions which closely resemble typical traffic flows.

SUMMARY

According to a first aspect of the invention, there is provided a method of testing communications equipment. The method comprises providing to the communications equipment a test traffic load which varies with time to a different level of test traffic load. The method also comprises measuring one or more parameter which characterizes the communications equipment in handling a transition of the test traffic load to the different level.

Thus, the testing method characterizes the communications equipment during a period when the traffic load is varying. This more closely resembles a typical traffic load.

Optionally, the communications equipment is operable in one of a plurality of power management modes. The method comprises providing the test traffic load comprises providing the test traffic load which varies with time, and the transition of the test traffic load to the different level triggers a change to a different one of the power management modes. The method measures one or more parameter comprises measuring one or more parameter which characterizes the communications equipment in handling a transition to the different power management mode.

Thus, an improved characterisation of communications equipment operable in one of a plurality of power management modes is obtained.

Optionally, the measuring comprises measuring the communications equipment in a time period in which a state of the communications equipment is dependent on the transition to a different level of the test traffic load and/or dependent on the transition between power management modes.

According to a second aspect of the invention, a testing apparatus for testing communications equipment comprises a test traffic unit configured to provide to the communications equipment a test traffic load which is configured to vary with time to a different level of test traffic load. The testing apparatus further comprises a measurement unit configured to measure one or more parameter which characterizes the communications equipment in handling a transition of the test traffic load to the different level.

BRIEF DESCRIPTION OF THE DRAWINGS

How the present invention may be put into effect will now be described by way of example with reference to the appended drawings, in which.

DETAILED DESCRIPTION

Aspects of the invention relate to a method and a testing apparatus for testing a communications equipment or system comprising communications equipment. The test apparatus measures one or more parameters, e.g. power consumption or loss of rate of the communications equipment, due to the varying traffic load. The measurements determine the direct response of the communications equipment to a transition in level of traffic load.

Abbreviations

Bps—Bit per Seconds
(EA) NMS—(Energy Aware) Network Management System
IMIX—Internet Mix (of traffic)
IUpp—Interval Unit peak to peak (measurement unit for short term (jitter) and long term (wander) variation relative to the ideal position in time.)
PMM—Power Management Mode
Pps—Packets per Seconds
QoS—Quality of Service
VBR—Variable Bit Rate In some examples, the communications equipment is operable in one of a plurality of power management modes. The test apparatus measures the response of the communications equipment to the transition event between power management modes triggered by the varying test traffic load. One or more parameter is measured, for example, corresponding to data performance of the network equipment.

In some examples, measurements are taken which correspond specifically to a time period when the communications equipment is handling the transition between traffic load levels, and/or in transition between power management modes, or when the communications equipment is in a state which is dependent on the transition between traffic load levels and/or power management modes.

Figure 1:
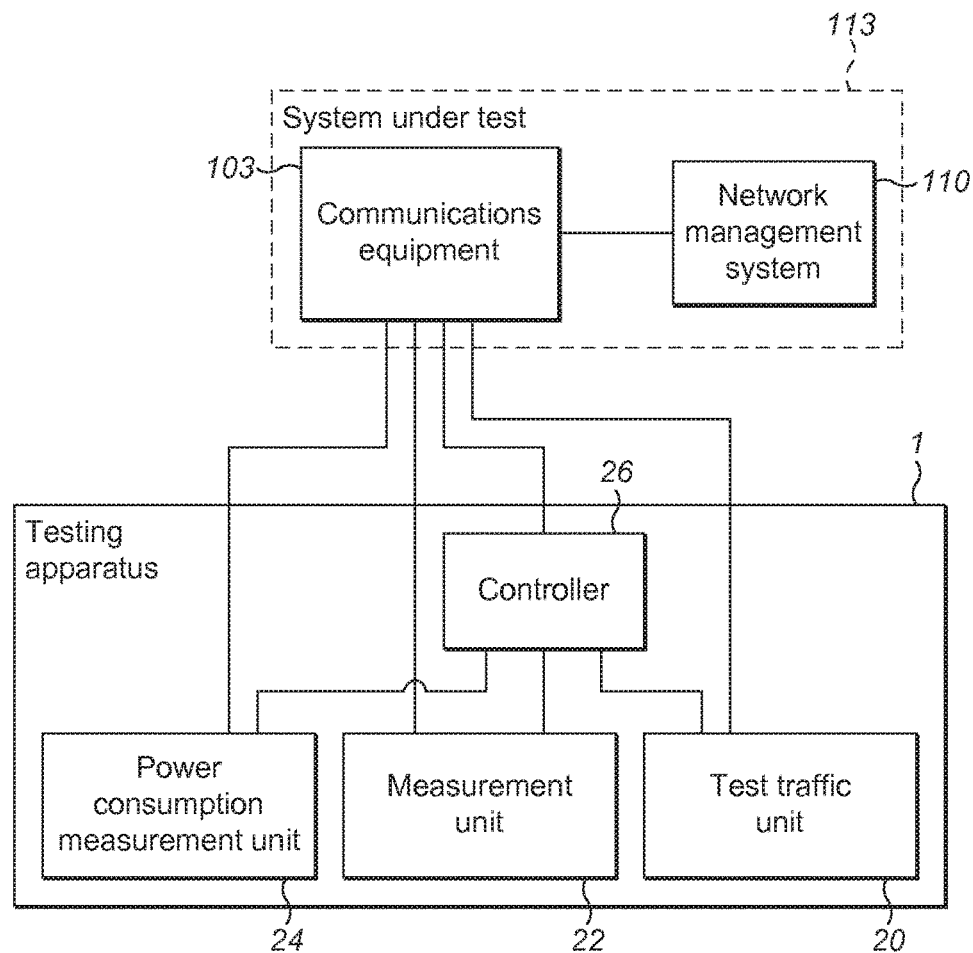
FIG. 1 shows a schematic view of testing apparatus according to an embodiment of the present invention, attached to communications equipment under test.

FIG. 1 shows an exemplary embodiment of testing apparatus 1. The testing apparatus 1 is connected to communications equipment 103, which is able to handle or process a data traffic load. The testing apparatus 1 is configured to test the communications equipment 103.

The communications equipment 103 is operable in one of a plurality of power management modes, which are described in more detail below. Power management modes are controlled by a network management system 110, although at least some of the modes may be locally controlled, e.g. by a system level management system. The communications equipment 103 and network management system 110 can be considered as a system 113 tested by the testing apparatus 1.

The testing apparatus 1 is configured to provide the test traffic load and/or measure one or more parameter relating to the handling of the test traffic load. In some examples a processor, memory and interface are configured to provide the test traffic load and/or measure one or more parameter.

The testing apparatus 1 comprises a test traffic unit 20 configured to provide the test traffic load. In an embodiment, the test traffic unit 20 generates or distributes the test traffic load. In some examples, the test traffic unit 20 comprises a memory storing the test traffic load to be provided. In a further embodiment, the test traffic load generates the test traffic load from information provided, or distributes a received test traffic load. In some examples, the testing apparatus 1 is configured to store a plurality of test traffic load shapes. In some aspects, the test traffic load shape is controlled by a user.

The testing apparatus 1 further comprises a measurement unit 22 configured to measure one or more parameters of the communications equipment, a link or a connected network node (described later). In particular, the measurement unit 22 is a traffic parameter measurement unit, configured to measure one or more parameters relating to the handling of traffic by the equipment. Such a traffic parameter comprises one or more the data throughput, jitter, latency, loss of rate. Such a traffic parameter does not include power consumption or the transition time, since these are not directly measures of the handling of the traffic or data. In some examples, the measurement unit is merged or integral with the test traffic unit 20. In particular, a merged measurement and test traffic unit is configured to provide a test traffic load and measure at least one parameter, in particular, loss of rate. An optional further measurement unit measures one or more further parameter, e.g. a traffic or non-traffic parameter.

The testing apparatus 1 further comprises a power consumption measurement unit 24 configured to measure the power consumption of the equipment under test. In some examples, the power consumption measurement unit 24 also measures transition time from one to another PMM.

In some examples, a connection to the equipment under test provides information on the power management mode currently operating in the equipment under test. For example, the connection is to one or more module, e.g. a line card, within the communications equipment 103 or system 113 under test.

The power consumption measurement unit 24, test traffic unit 20 and measurement unit 22 are connected to a controller 26 configured to coordinate and correlate the measurements. The units 20, 22, 24, 26 described are examples only, and any unit or function can be integrated or separated from any other unit or function. The units 20, 22, 24, 26 shown are functional only, and the separate description does not imply the units are separate hardware or software entities.

The testing apparatus 1 is configured to record one or more parameters of the communications equipment 103 under test. The parameters tested comprise traffic parameters relating to an aspect of the traffic, and power parameters, and/or information on the current power management mode. A data plane of the communications equipment 103 is tested by switching between suitable traffic loads, as will be described. For each of these traffic loads, as well as for each high-to-low and low-to-high transition event, parameters related to traffic performances and energy consumption are collected and correlated by the testing apparatus 1.

The testing method and apparatus 1 is arranged to test communications equipment which has power management/consumption modes to enable a change of performances and in power consumption to comply with the effective (actual) needs. Power consumption is defined as power consumed by a device to achieve an intended application performance (useful work).

Power management modes (or power modes) are defined as a set of functionality enabled/disabled modes on the apparatus. In some examples the communications equipment is controlled by an energy aware control plane, e.g. the network management system 110, able to modify equipment power consumption by setting the power mode as a function of traffic load. The equipment provides traffic routing that is power consumption aware and capable of minimizing overall power consumption at a network level. The different power management/consumption modes provide different levels of performance in passing communications traffic.

The communication or network equipment 103 can utilise dynamic energy management features including multiple low power logic states and multiple sleeping states. The network equipment allows power saving due to reducing the power to overprovided capabilities. The characterization provided by the testing method described can be provided to the network management system for better controlling of the equipment or network.

The testing method and apparatus 1 tests the network management system 110 for its capability to minimize power consumption, and maximize low power modes adoption without jeopardizing network performances and quality of service. The network management system 110 controls entering and exiting the PMM states and/or routing of traffic. The method tests, at node or network level, the network management system 110 computation of the optimal traffic routing and power management mode for an or each equipment or device under control.

References to communications apparatus equipment includes any kind of communications or network equipment, apparatus or module, for example but not limited to: routers, switches, endpoints, such as Power over Ethernet (PoE) endpoints, transport equipment, protocol gateways for building management systems, intelligent meters, home energy gateways, hosts, servers, and sensor proxies.

The communications equipment or apparatus can refer to a device or system, or a module within a device, e.g. cards or circuits, which are capable of being operated in different levels of performance in passing the communications traffic in different power consumption modes.

References to software can encompass any type of programs in any language executable directly or indirectly on processing hardware. References to controllers, units, processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node (network element) or distributed at different locations for example.

The testing apparatus 1 is configured to measure one or more parameter of the communications equipment 103 relating to a change in energy consumption by the equipment while doing actual work. The change in energy consumption is between a higher power mode and a lower power mode, in either order. In both higher and lower energy mode the equipment may be active (i.e. not sleeping) and handling a traffic load.

In this case, the actual work is at a guaranteed quality of service, although a lower energy mode may imply some marginal performance degradation may be accepted and measured. The change in energy consumption by the equipment 103 may be into or from a power mode having reduced energy consumption during extended idle periods (no traffic flows). In this case functional, performance or other degradations may be heavy since no traffic flow is needed during such idle periods.

The testing apparatus 1 is configured to measure one or more parameter during a transition event of a level of the traffic load and/or a transition event into a different power mode. Typically, a transition event of the level of the traffic load will trigger the transition event into the different power management mode. Therefore, characterizing the communications apparatus 103 handling a transition of the test traffic load may refer to either or both of the communications equipment 103 handling the transition of the test traffic load which does not trigger a transition in power management mode, and the communications equipment 103 handling the transition of the test traffic load and the triggered transition in power management mode. Some transitions of the test traffic load do not trigger a transition of the power management mode, and in some examples, at least one transition of the test traffic load does trigger a transition of the power management mode.

The testing apparatus 1 can determine whether the power management mode control and wake-up time are coordinated and prompt enough to withstand sudden traffic ramping up. Thus, the testing equipment can determine whether the network equipment can guarantee quality of service.

The testing apparatus is configured to test the equipment in a manner which is beyond merely increasing the number of static traffic loads (% levels) at which the equipment is characterized. The testing apparatus 1 is arranged to determine one or more of:

performance in terms of, e.g., traffic maximum data throughput, burst withstanding capability, latency, jitter, or other parameter, when the device is "stably" in the given power-mode state.

traffic parameters, e.g. packet loss, packet errors, for example, as associated with the transitions from one power state (or traffic load state) to another, and in a time between such transitions.

The testing apparatus 1 provides a variable-load metric, running multiple and coordinated measurements of key indexes when dynamically changing the traffic load. The testing apparatus 1 is arranged to test power-saving solutions aimed to provide fast and effective flexibility to lower the performances of lightly utilized modules.

The testing apparatus is arranged to record or receive data on one or more of the following parameters (indexes):

a) maximum data throughput (bits per second or packets per second). The data throughput at reduced performances and power management modes may alternatively or also be measured.

b) loss of rate (bits per second or packets per second) and loss of rate variance (in bit or packet per sec or in %) compared to maximum performance condition;

c) transition time (seconds) of power management modes, for performance adaptation on the basis of traffic load as well as to enter and exit the sleeping modes;

d) latency (seconds) at maximum performance and latency variance (in seconds or as a %) compared to maximum performance condition;

e) jitter (IUpp) at maximum performances and jitter variance (in IUpp or in %) compared to maximum performance condition;

f) power consumption (watts) at maximum performances and power consumption variance (in watt or in %) compared to maximum performances condition.

These parameters are now described in more detail.

Data Throughput

The testing apparatus is configured to generate a variable bit rate (VBR) to test data throughput. The traffic mix of the data can affect power consumption and quality of service. In order to accurately test the equipment 103, different packet sizes are transmitted as the test signal. The variation in packet size can result in different queuing and processing effort. The traffic load uses variable bursts sizes. In particular, the traffic load provided uses the Complete Packet Lengths Internet Mix (IMIX) traffic model, resembling a mix of packet sizes that can be seen in actual real internet world. The distribution of packet sizes is shown in Table 1.

TABLE 1

| Complete IMIX | | |
|---|---|---|
| Packet Size (Bytes) | Proportion of Total | Bandwidth (Load) |
| 40 | 55.0% | 5.15% |
| 576 | 15.0% | 20.25% |
| 1500 | 12.0% | 42.20% |
| 40-1500 (range) | 18.0% | 32.40% |

The percentages of traffic load on VBR interfaces refer to the nominal rate of each interface.

The methodology to measure throughput is to send a specific number of packets (or bits) at a specific rate to the equipment under test (ingress) and then count the packets (or bits) that are transmitted by (egress) the equipment under test. Alternatively, frames in ingress and egress may be counted. The maximum throughput is defined by the highest data throughput showing the count of the offered packets equal to the count of received packets (no packets loss). Different test rates can be provided to determine the maximum throughput with no loss.

For example, if the count of offered packets is equal to the count of received packets, an example test traffic load is raised by a small amount, e.g. 1%, and the test is rerun for enough time to determine the bit and/or the packet loss ratio. As soon as fewer packets are received than were transmitted, the rate of the offered stream is reduced by e.g. 1% and the test is rerun. If the condition of equal count between offered and received packets is never reached, the maximum throughput shall be the highest data throughput showing the lowest bit or packet loss ratio.

The testing apparatus 1 is configured to identify the maximum throughput (rate) of the given level of traffic load, also referred to as traffic flow. The maximum throughput is determined for a particular or each power management mode. Throughput can alternatively be defined allowing a pre-determined threshold data loss.

Loss of Rate

Loss of rate is defined by fewer packets (or bits of data) being received than were transmitted. For example, fewer packets (or bits of data) can be received from the equipment being tested than were sent by the testing apparatus 1 to the equipment being tested. The loss of rate is recorded by the testing apparatus 1 for a particular power management mode.

If applicable, the loss of rate is recorded for a transition between two power management modes. The loss of rate is a measure of performance degradation. The loss of rate is measured at each one-way traffic flow, i.e. source to destination.

The loss of rate is measured by the testing apparatus 1 at each of the possible power management modes where traffic flow is allowed, and compared to the loss of rate at the maximum performance of the equipment 103 under test (i.e. at maximum processing capacity). The difference between the losses of rate at a power management mode and the maximum capacity power management mode is optionally used as a parameter of performance degradation. The difference in losses of rate can be expressed as a proportion or as an amount in packets (or bits, or frames) per unit time.

Switching between different power management modes can result in a wake-up time which impairs the circuitry under test or can induce electrical instability to adjacent circuits. The loss of rate is monitored and recorded during power management mode transition by the testing apparatus 1. The loss of rate is monitored and recorded for adjacent circuits.

Transition Time

The transition time is the time taken by the equipment 103 under test to fully switch between power management modes. The transition time is applicable to any change in power management mode. The transition time is measured for all transitions, and is of particular significance in a transition involving a sleeping power management mode. The transition time may be measured in coordination with the given traffic flow, traffic load and power management mode, and properly correlated to those parameters. The entering and exiting time from/to each power management mode can be measured, and for example, expressed in seconds.

The time to enter and exit the power management mode can be measured by means of a suitable "trigger signal" specifically made available by the equipment 103 under test.

Latency

Latency is measured as the time delay experienced by each one-way (source to destination) traffic flow. The latency is correlated to the level of traffic load and the current power management mode.

Determined performance degradation in terms of latency can be expressed as the difference between the values of packet (or identified bits) latency in the case of maximum performances device (i.e. with the equipment under test at maximum possible processing capacity and hence at maximum power consumption), and the latency measured at each of the other possible PMM states where traffic flow is allowed. The difference can be expressed as a proportion or an absolute value.

Latency can be caused by a number of factors, including clock scaling used by one or more power management modes. Thus, power reduction in an energy aware system 113 can cause an increasing of delays, which is measured as latency.

Jitter

Jitter is a deviation from true periodicity, for example, in a clock signal. Jitter may be influenced by power reduction. Jitter experienced by each one-way (source to destination) traffic flow is measured by the testing apparatus 1. The jitter is correlated, e.g. to the power management mode. Jitter degradation can be expressed as the difference between the values of packet jitter in the case of the equipment under test at maximum processing capacity and the jitter measured at each of the other possible power management modes where traffic flow is allowed. The measurement of jitter may be particularly applicable to equipment using time division multiplexing.

Power Consumption

Power consumption of the equipment under test 103 is measured for a plurality of power management modes. The power is measured in strict coordination with the given traffic load and/or power management mode. The power consumption is correlated to the power management mode and/or traffic load.

The power consumption is measured individually for each power management mode which is tested. The power consumption measured includes only one power management mode, or only one transition between adjacent power management modes.

Power consumption reduction can be expressed as the difference between the consumption at maximum performance of the equipment under test (i.e. with the equipment under test at maximum possible processing capacity and hence at maximum power consumption), and the power measured at each of the other possible power management modes, comprising states where traffic flow is not allowed (sleeping modes).

The measurements for any parameter, e.g. power consumption, are recorded over a time period which is selected such that only one traffic load level (or one transition between traffic load levels) is provided to the equipment under test. Thus, the measurements are recorded over a relatively short time. This allows the response of the power consumption of the equipment under test to be separately determined for each transition or traffic load level, and/or separately determined for each power management mode.

Test Traffic Load

The measurement method according to an aspect of the invention characterizes and assesses the dynamic performance adaptation to the equipment 103 under test during variations in traffic load. In particular, the test traffic load generated is arranged to vary in magnitude over time.

Figure 2:
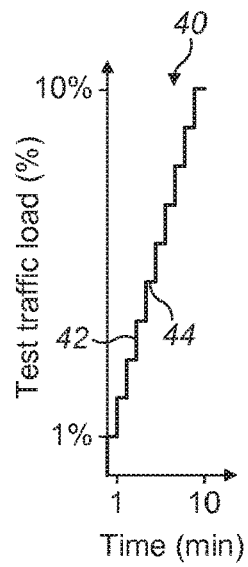
FIG. 2 shows an output traffic load of an embodiment of the testing apparatus.

FIG. 2 shows an example of the test traffic load 40. In this example, the test traffic load is increasing. The test load 40 increases at each of a plurality of transitions 42. The test load 40 is at a constant level for a time period 44 between transitions 42. The test traffic load 40 is in the form of a plurality of steps.

The variation in test traffic load 40 with time can be considered as a gradient of the test traffic load. The test traffic load generated can increase or decrease over time, i.e. the traffic load gradient is in a positive or negative direction. The traffic load gradient has a magnitude. The magnitude is defined as the change in traffic load divided by the time over which that change occurs. The traffic load varies as a pre-determined pattern. The pattern is repeatable to compare the response of different communications equipment. The traffic load gradient may start and finish at any level.

The test traffic load gradient 40 comprises a plurality of transitions or variations in the same trend or direction (i.e. traffic load level increasing or decreasing). The transitions may also be referred to as a transition event or step. Thus, the traffic load comprises a plurality of consecutive transitions, which consecutively increase or consecutively decrease the traffic load.

Each variation of traffic load 40 can have the same magnitude and be equally spaced in time, in which case the traffic load gradient is a constant gradient. Alternatively, the gradient is not constant, i.e. varies over time. The variations can vary in magnitude and/or spacing in time. The steps are continuous in time, i.e. each step follows directly from a preceding step. The test traffic load is continuous, i.e. the varying test traffic is provided without a break in time. Measurements are taken concurrently with the provided test traffic. As such, the measurements may also be considered as recorded continually.

The time periods 44 between transitions in traffic load are at a particular constant traffic load level. Each traffic load level can itself comprise a variation in traffic loads, which average to the determined traffic load level. For example, bursts of packets separated by a pre-determined time can be considered to average to provide a particular traffic load level. The testing method described herein relates to varying the testing traffic load level, which may or may not have been averaged at a shorter timescale.

The test traffic load may have a substantially uniform distribution of traffic (e.g. IMIX traffic) or comprise bursts. Uniform distribution has the advantage of simplifying power measurement and avoiding complex averaging. This may be apply in particular to networks levels where traffic is aggregated, such as in transport, or metro nodes or high level routers. In this case, aggregated traffic from many different users or servers results in a substantially uniform distribution of traffic, which the testing apparatus may simulate.

For burst traffic, in some examples, power consumption may be averaged between traffic state power consumption and burst time duration, idle power and duration, and if considered, discovery pulses between the bursts. The appropriate traffic method may be selected depending on the characteristics of the equipment under test and/or applicability to a standardized test.

The test traffic load 40 provided to the communications equipment has a range which varies through at least one threshold for a power management mode transition of the communications equipment. Thus, in response to a pre-determined variation in traffic load level, the equipment under test varies the power management mode in operation. The testing apparatus 1 is configured to test the equipment according to the selection of power management mode for the varying test traffic load. The testing equipment 1 records the one or more parameters of the equipment 103 under test at intervals (or over sampling periods) during the time period of the continually varying test traffic load 40.

The one or more parameters are sampled continually. Parameter measurement may be carried out by continuous sampling. The samples are correlated to the given test condition, i.e. PMM. Alternatively or in addition, measurement sampling of one or more parameter is triggered by an event. For example, measurement sampling is triggered by a transition event to a different traffic load level and/or a transition event to a different PMM. The testing equipment 1 can determine the parameters tested at each step. The one or more parameters are sampled such that variations directly due to a change event in power management mode and/or change event in the test traffic load are measured.

The one or more parameters are sampled during and/or immediately after the transition of power management mode. The parameters sampled during and/or immediately after the transition of power management mode provide a measurement of the dynamic response of the equipment under test to the variation in traffic load and/or variation at, during and/or immediately after the transition of power management mode. The parameters are measured in a test time period which includes one or more transition events.

The recordal of at least one parameter is carried out over a relatively short time scale. The relatively short time scale is such that the parameters recorded during and/or immediately after the transition of power management mode steady-state are not obscured by averaging with a steady-state measurement which is not dependent on the actual mode transition.

Sampling periods in which measurement are made are typically shorter than the time spacing 44 between transitions 42 of the test traffic load. Sampling should be at high enough frequency to ensure proper gathering of parameters within the given steady-state time spacing 44 (PMM constant). For example, power consumption may be averaged over a time which is shorter than the steady-state in time spacing 44.

At least some of the recorded parameter samples can be related only to the event of or prompted by the traffic load variation, e.g. only to the transition, or only to the time period directly following and affected by a transition. The sampling of the parameter measurements is over a short time period such that the times where the communications equipment is dependent on the transition can be identified. In particular, traffic loss is determined as a direct consequence of the transition event.

Any of the parameters can be measured specifically during the transitions of power management mode and/or test traffic load 42. For example, traffic loss can be measured during such transitions.

In one aspect, the characteristics of the equipment 103 under test (e.g. traffic loss during power mode transitions) are determined by applying a test traffic load which increases (e.g. with a traffic load gradient) from a traffic load of a lower power management mode to a traffic load to enter the next given higher power management mode. The test traffic load may increase to a minimum traffic load of the higher power management mode.

A further example of test traffic load decreases over time from a higher power management mode to a traffic load below a threshold to enter the adjacent lower power management mode. The traffic load may decrease to a maximum traffic load of the lower power management mode.

The characteristic of the equipment is recorded by the Network Management System. The NMS 110 may be programmed to take action to avoid or mitigate exceeding the determined characteristic, if possible. For example, the NMS 110 can avoid exceeding the characteristic (which may result in packet loss) by one or more of: keeping higher traffic load margins (e.g. by reprogramming traffic thresholds; by relaxing the sleeping PMM transitions, and/or by routing active traffic, e.g. towards better performing devices.

A suitable test traffic load gradient may be determined from measurements on a live network. The network may be examined at various points and/or at various times (e.g. in a 24 hour period). Variations detected can be averaged over time to provide linear test gradients.

The test gradient can be used to determine a characteristic of how the equipment 103 reacts to a variation in traffic load, e.g. a relatively sharp increase or decrease. This provides a more realistic test of the equipment than handling a fixed traffic load.

In an example, measured traffic loads have been recorded to increase by 10% of the maximum throughput in 10 minutes. A test traffic load signal replicating this would also increase by the same amount, i.e. 10% of the maximum throughput in 10 minutes. References to a step amount percentage (%) refers to an amount of bits or packets as a percentage of the maximum throughput (and not a percentage change from a previous level).

The test traffic load linearly increases or decreases (i.e. the gradient is constant), although a plurality of different linear test traffic load gradients can be transmitted sequentially. Alternatively, the test traffic load increases or decreases in steps which are not uniform in magnitude and/or time spacing. The test traffic load increases or decreases in any form of arc or curve.

The exemplary test traffic load unit is configured simulate a linear or constant gradient traffic variations 40. As explained above, test traffic load unit 20 generally does not vary the load continuously, but instead varies the test traffic load in steps. The steps vary the traffic load to a new level abruptly. The plurality of steps are configured to simulate a constant gradient of test traffic load. The steps and intermediate constant loads are continuous. In some examples, the varying test traffic load provides a relatively large number of different levels, allowing precise characterization of the equipment at the different levels. Alternatively, the varying test traffic load can be considered as continuously varying in level.

The test traffic load is provided as a single or continuous signal, which varies without a break in time. One or more parameter is recorded continually (i.e. without a change in recording) throughout the overall testing period, although a break is possible for a re-run. In some examples, the test traffic load 40 comprises more than one step, more than two steps, more than three steps, more than five steps, or more than seven steps in the same direction.

For example, the linear 10% in 10 minute gradient is modeled by consecutive 1% step changes in traffic load, and 1 minute time at each traffic load step, so approximating the continuous function.

A higher stressing gradient can comprise a higher traffic load level change e.g. 5% steps spaced by 1 minute, or a same traffic load level change in shorter waiting time, e.g. 1% transition steps spaced by 30 seconds. In a further aspect, the test traffic load varies in the gradient between 3% and 50%, for example between 5% and 30%, or for example between 5% and 15%. The overall test traffic load may comprise more than one such gradient. The overall test traffic load may vary between 0% and 100%.

Traffic Load Levels

Figure 3:
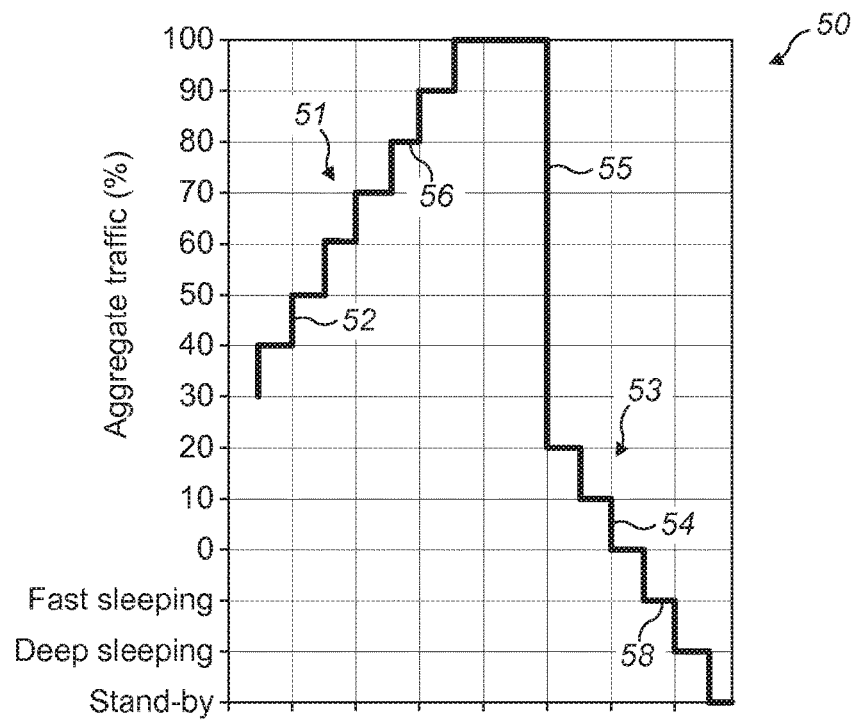
FIG. 3 shows a further output traffic load of an embodiment of the testing apparatus.

FIG. 3 shows a test traffic load 50 comprising two traffic load gradients. A first gradient 51 comprises transitions 52 intermediate constant traffic load levels 56 to form steps. The first gradient 51 simulates a linearly increasing traffic load. A second gradient 53 comprises transitions 54 intermediate constant traffic load levels 58.

The second gradient 53 simulates a linearly decreasing traffic load. The second gradient 53 follows immediately (consecutively) after the first gradient 51. The first and second gradients 51,53 are continuous in time, i.e. the second gradient follows directly after the first gradient. The first and second gradients 51,53 are not continuous in traffic load level, the end of the first gradient 51 is higher than the start of the second gradient 53 by an amount 55 which is more than the steps 52,54. The amount 55 indicates an abrupt change in traffic load level, to simulate a very sudden change in traffic level. The testing apparatus 1 measures the direct response of the communications equipment 103 to the variations in test traffic load.

Figure 4:
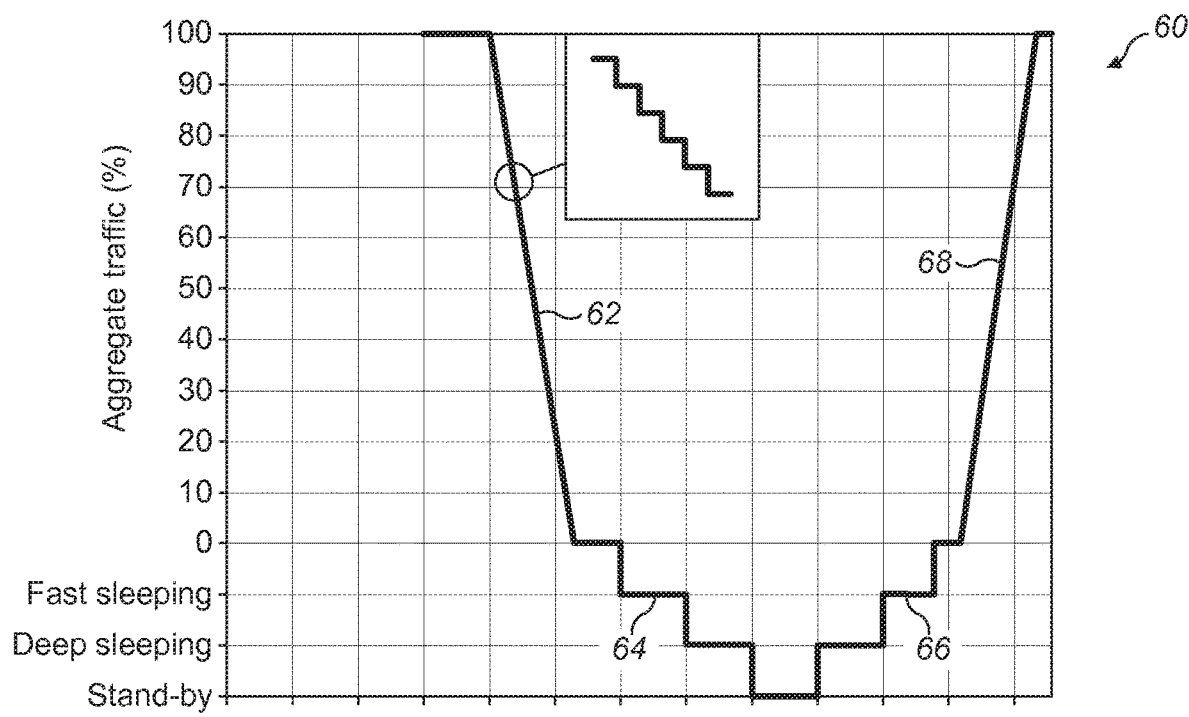
FIG. 4 shows an output traffic load of an embodiment of the testing apparatus.

FIG. 4 shows a test traffic load 60 comprising a plurality of traffic load gradients 62,64,66,68. The test traffic load 60 comprises traffic load gradients having different magnitudes of gradient (slope). The test traffic load also comprises traffic load gradients having different directions of slope (both increasing and decreasing. The overall shape of the test traffic load 60 is a u-shape.

The example of test traffic load 60 shown comprises a first gradient 62, having a relatively high slope and a decreasing direction. The first gradient 62 comprises relatively small steps and a constant load for a short time period, providing a "smooth" variation in load which is relatively close to a linear slope.

The first gradient is directly followed by a second gradient 64. The second gradient 64 has a lower magnitude of slope. The second gradient 64 continues the decreasing direction of traffic load.

The second gradient 64 is directly followed by a third gradient 66. The third gradient 66 has the same magnitude of slope as the second gradient 64. The third gradient 66 is in the increasing direction of traffic load.

The third gradient 66 is directly followed by a fourth gradient 68. The fourth gradient 68 has the same magnitude of slope as the first gradient 62. The fourth gradient 68 is in the increasing direction of traffic load.

Figure 5:
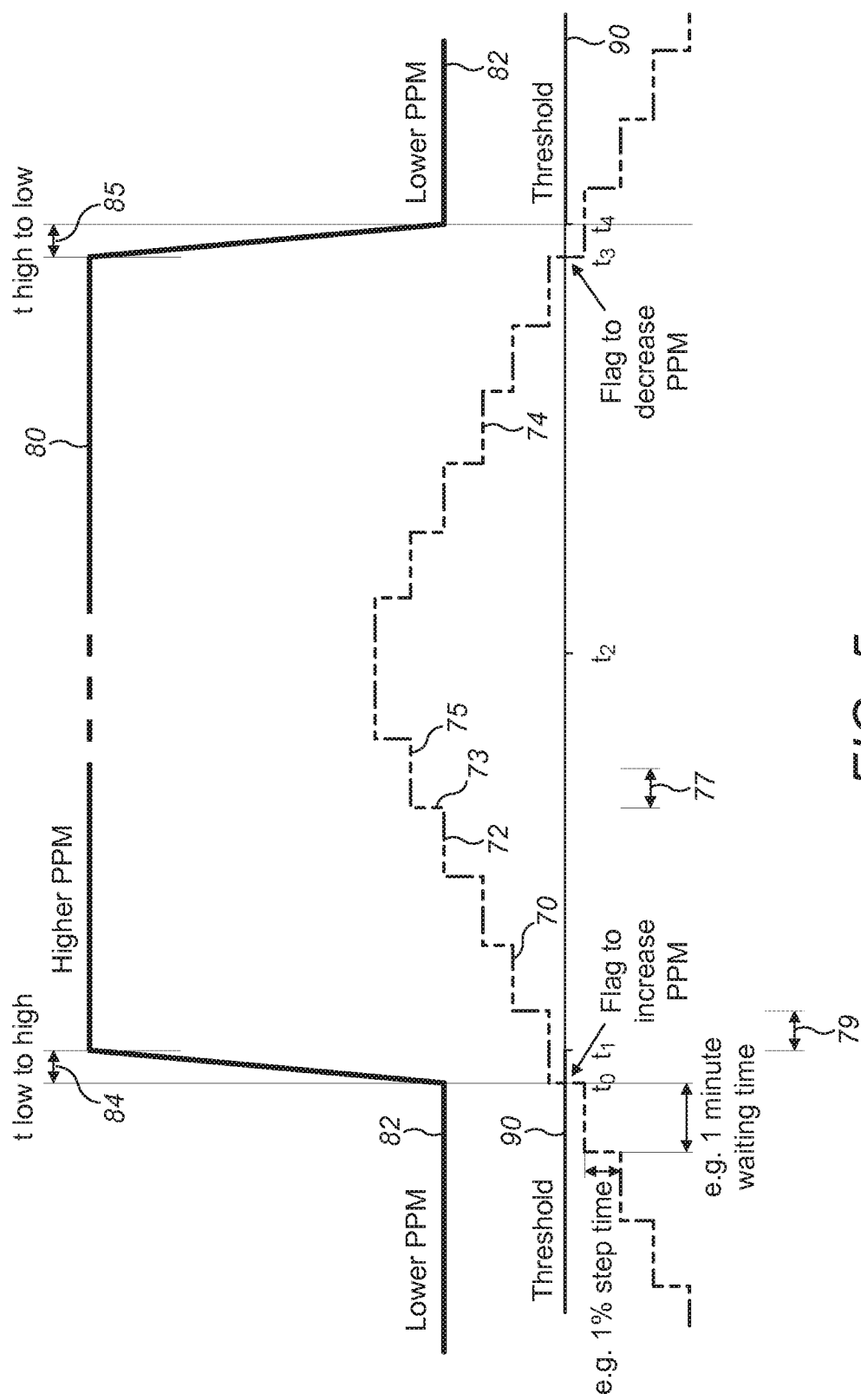
FIG. 5 shows an output traffic load of an embodiment of the testing apparatus, with a corresponding power management mode of the communications equipment under test.

The test traffic load is not limited to the examples shown, and may have any combination of one or more magnitudes of gradient and/or one or more directions of gradient, in any combination or number. A particular magnitude of slope may have a quantity of steps which is selected according to how closely a linear slope is to be simulated. In particular, the more steps, the closer the simulation of a linear slope. FIG. 5 shows an example of a test traffic load 70, and a power management mode 80 of equipment under test. The equipment 103 under test is handling the test traffic load 70, The test traffic load has an increasing gradient 72, followed by a decreasing gradient 74. The test traffic load 70 is configured to trigger at least one power management mode transitions, and in this example, triggers two such mode transitions in periods 84,85.

The equipment is initially in a lower power management mode 82, i.e. a mode consuming relatively little power. As the test traffic load received by the equipment 103 from the testing apparatus 1 increases over time, the test traffic load reaches a threshold 90 of the system 113 under test. The equipment 103 is arranged to change the power management mode once the traffic load varies past the threshold. In this case, the power management mode is changed to a higher power management mode 86 capable of handling the increased traffic load.

The equipment 103 under test typically cannot change power management mode instantly. Instead, there is a transition period 84 between times $t_0$ and $t_1$ during which the power management mode is introduced. In some embodiments, the test equipment is configured to measure at least one parameter of the equipment specifically indicating the performance of the equipment in a time period where performance is dependent on the transition.

For example, the measurements relate to a time during the transition period 84, and optionally, immediately after the transition period, e.g. in time period 79. For example, the equipment is characterised during the transition period and/or specifically in a time period where performance is dependent on the transition. A typical time for transition may be between microseconds and seconds.

Thus, the test traffic load 70 is arranged to prompt a change in power management mode from the equipment under test, and measure a parameter which is directly connected to how the equipment handles the transition of power management mode.

For example, the testing equipment measures a parameter (e.g. loss of rate) over a time which is associated with the transition event, e.g. wholly within the transition period 84, and/or over a time at least partially determined by the transition event.

The testing apparatus 1 is configured to measure one or more parameter at each test traffic load transition 73. For example, one or more parameter is measured only for a particular time period 75 in which the test traffic load is constant between transitions. For example, the parameters measured with the traffic load constant are data throughput, loss of rate, transition time of PMM (when it occurs), latency, jitter and/or power consumption.

The test traffic load 70 is varying continually (and without separation of the different test traffic loads). Thus, the constant test traffic load does not necessarily result in a static state of the equipment 103 under test.

In particular, a constant test traffic load 75 directly following a power management mode change or other response may show a transient or temporary response of the equipment under test. For example, a time period 77 captured by the measurements corresponds to a sufficiently short time immediately after a variation in test traffic load to measure the dynamic effect of the variation in load on the equipment under test.

The testing apparatus 1 also samples one or more parameter whilst the communications equipment is in a static state. For example, one or more parameter is measured when the communications equipment has settled into a static state following a transition from a different power management mode and/or a variation in the test traffic load.

In some examples, the testing apparatus 1 is configured to measure different parameters at different events within the test traffic load, e.g. at a transition 73 or static state 75. For example, the loss of rate is measured specifically at the point in time where the traffic load is varied (e.g. transition 73).

The testing apparatus 1 is configured to detect one or more parameters (e.g. indicating errors by the equipment) which occur only in a short period of time immediately following a change in test traffic load and/or power management mode transition. The one or more parameters measured at or around the time of a change of test traffic load may be at least partially different to the one or more parameter measured when the communications equipment is in a more static state between changes in test traffic load.

For loss of rate, the outcoming bit sequence from the equipment 103 is compared to the known test but sequence. If a bit is different from that expected, then it can immediately be detected as an errored bit. Instead of bits, testing apparatus 1 may compare packets, for example examining the entire packet prior to declaring an error. The time of the transition event can be correlated with a detected error to determine if the transition event caused the loss of rate. In this case, transition time can be comparable or even shorter then packet inspection time (which is also a function of packet length). Therefore, an error can be detected after the transition, although associated with the transition.

The test traffic load subsequently reduces from time $t_2$ in a stepped gradient 74. When the test traffic load reduces below the power management mode threshold 90, from time $t_3$, the power management mode returns to the lower mode. The equipment under test undergoes a further transition event in period 85 between times $t_3$ and $t_4$.

The system 110 under test is shown as having the same threshold for a power management mode change from a lower to a higher mode as the change from a higher to a lower mode. Alternatively, the upward and downward mode transitions can be at different thresholds, i.e. show hysteresis. The test traffic load still triggers the mode changes.

Network Test

An example of the testing apparatus 1 is configured to test equipment in a system or network having one or more devices or nodes. The following examples relate to testing of a system having a plurality of nodes, for example, three nodes. The system has one or more connections between each node, in any combination. In some examples, a single node or device is tested within the system, with the further nodes accessed to provide the test traffic load conditions to test the single node or device.

Figure 6:
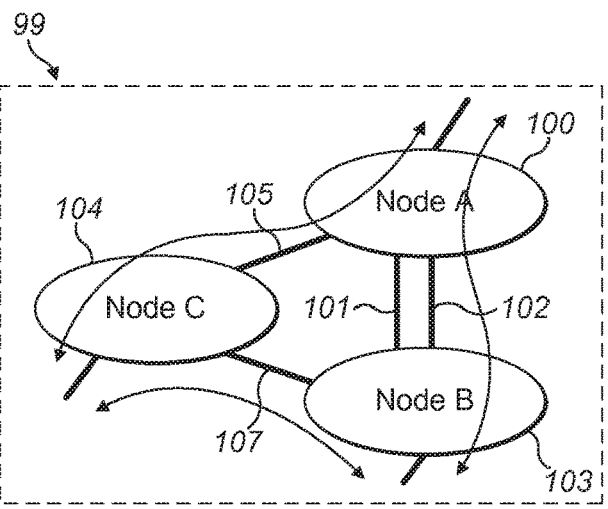
FIG. 6 shows an exemplary network including the communications equipment under test in a first power management mode.
Figure 7:
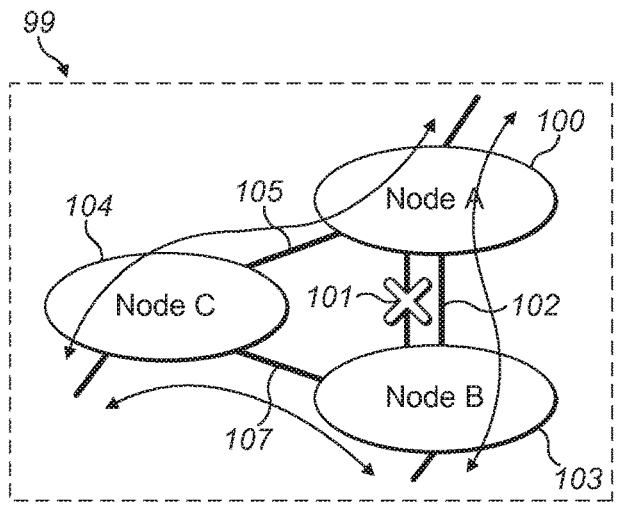
FIG. 7 shows an exemplary network including the communications equipment under test in a second power management mode.
Figure 8:
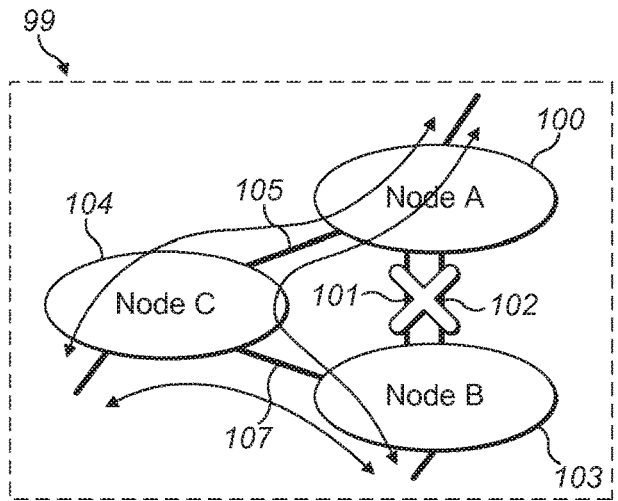
FIG. 8 shows an exemplary network including the communications equipment under test in a third power management mode.

FIGS. 6, 7 and 8 show a network 99 comprising three connected nodes. Node A 100 is connected to a Node B 103 by one or more links, in this example, by a first link 101 and a second link 102. Node B 103 is the node or equipment under test. Node A is connected to a Node C 104 by a third link 105. Node C 104 is also connected to Node B 103 by a fourth link 107. One or more of nodes A,B,C have ports providing for ingress and egress of traffic.

The test traffic load provided to the network 99 is configured to vary to characterize the node under test. In particular, the test traffic load level is configured to vary to characterise the node 103 under test in inactivating particular links, e.g. in one or more sleeping modes.

FIG. 6 shows all links 101,102,105,107 operational and handling traffic. The links are any type of link, for example, wired, wireless, air, optical or electrical, link. For example, the network may at least partially be an optical network. The test traffic between Node A and Node B is reduced step by step until reaching a traffic load level that can be managed by a single link between Node A 100 and Node B 103. FIG. 7 shows the system 99 with the first link 101 inactive (sleeping). The Node B 103 is partially in a sleeping mode.

The test traffic level is further reduced until reaching a traffic load between Node A 100 and Node B 103 that can all be routed through Node C 104.

FIG. 8 shows the first link 101 and second link 102 inactive (sleeping). The Node B 103 is in a further (deeper) sleeping mode. Node A 100 also progressively enters deeper sleeping modes as the traffic load level provided by the testing apparatus 1 decreases.

In an example network 99 under test, the first link 101, second link, 102, third link 105 and fourth link 107 each have 10 Gbps max throughput.

The equipment under test has a plurality of sleeping modes, which are characterized in the test. For example, the sleeping modes can be termed Fast Sleeping, Deep Sleeping and Power-Off. Further sleeping modes can exist. The sleeping modes are power management modes where the equipment under test is in a condition where no traffic can pass through at least a part of the equipment. For deeper and deeper inactivity levels, there is reduced power consumption and increased wake-up time (time to resume capability).

For the power management modes (and in particular the sleeping modes) one or more of the following parameters are measured:

- at equipment under test: traffic parameters, e.g. one or more of transition time of PMM, power consumption, data throughput; loss of rate; latency; jitter. In some examples, these parameters are measured for the equipment or link which is handling the varying test traffic load, e.g. varying in a gradient.
- at an alternative path or link: traffic parameters e.g. one or more of data throughput; loss of rate; latency; jitter. The alternative path or link may be handling re-routed test traffic, e.g. due to a sleeping mode of the equipment under test.
- at adjacent links or adjacent cards within a node or the communications equipment: traffic parameters, e.g. of loss of rate (to verify no impairments propagate during PMM transition). For example, when changing the power supply to a portion of circuitry or card, a current variation may induce electromagnetic interference on an adjacent circuit or card that may induce errors on a data path not apparently affected by the PMM. Such a parameter on an adjacent component is a measure of the effect of the transition.

In some aspects, the equipment under test can operate clock scaling and/or voltage scaling as function of traffic load at a given engine or line driver, and/or when traffic is routed towards certain resources to can sleep the remaining resources. The testing apparatus 1 is arranged to test the real-time effects of such power changes.

Figure 9:
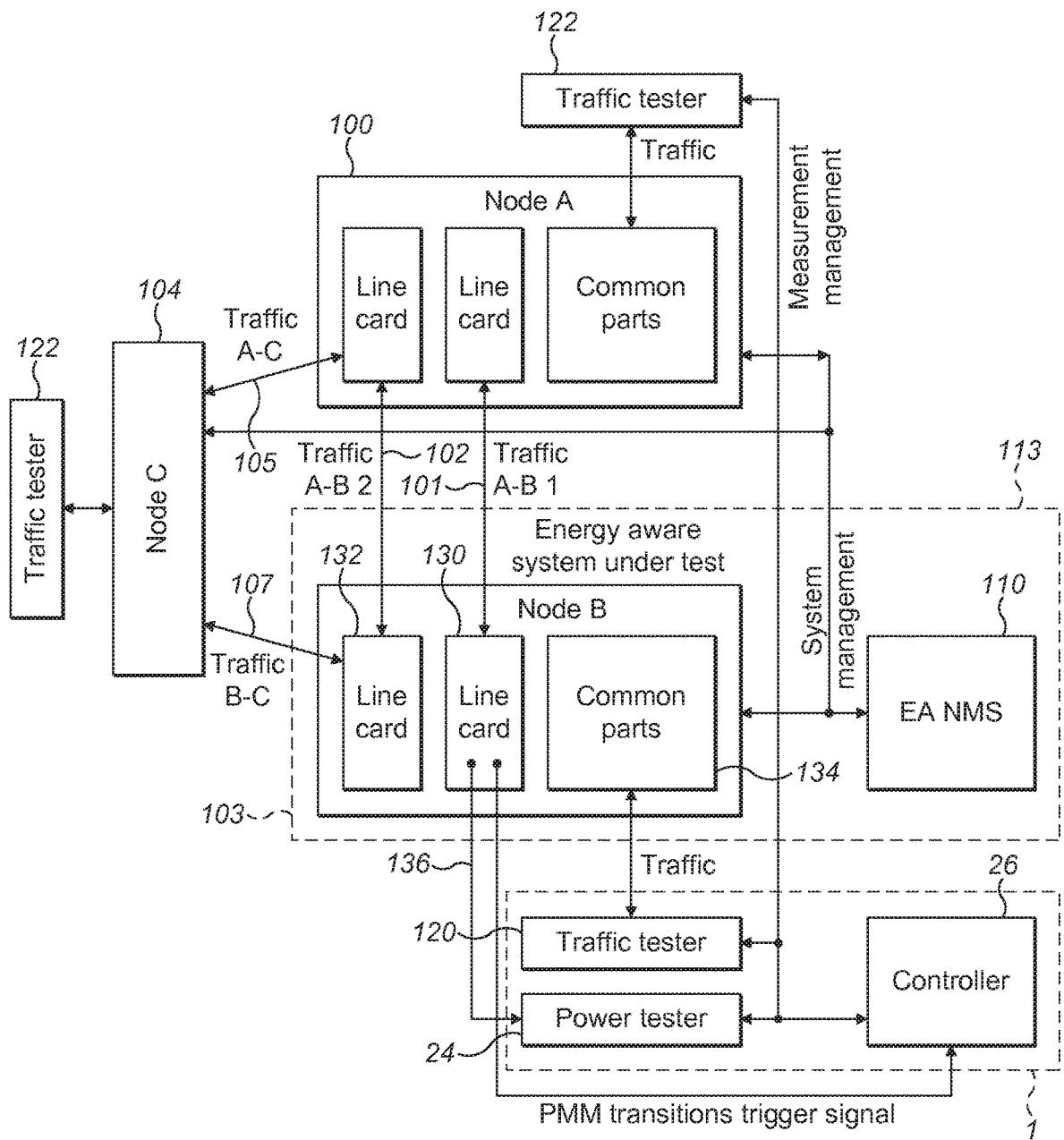
FIG. 9 shows a schematic view of testing apparatus according to an example of the invention and communications equipment under test in a network.

FIG. 9 shows details of the three node test network, and details of the equipment under test and testing apparatus.

The node B 103, as controlled by an energy aware network management system (NMS) 110, is the communications equipment under test. The equipment under test can be considered as including the functionality of the NMS 110, as a system under test 113. The communications equipment and network management system can together be considered as the equipment or system under test 113. The NMS can be separate and connected to the node B 103 (and optionally other nodes), or integrated with the node.

The NMS 110 is coupled to receive traffic load information from the communication apparatus 103. In some examples, the NMS 110 receives information about power consumption modes of the communications equipment 103. The NMS 110 is arranged to output control signals to the communications apparatus to control its power consumption mode. This control can be carried out based on information about load and/or according to information about the traffic paths selected.

In some embodiments, the NMS 110 can make path selections for new traffic demands based on the traffic load information and/or on information about the power consumption modes of the communications apparatus. The functions of the NMS 110 can be implemented as software functions running on a server or any kind of processor. The path selection can use any type of path selection algorithm, adapted to make use of the power consumption mode information. The testing apparatus 1 is configured to test the combined path computation and the control of power consumption modes.

The node B 103 comprises standard components to function as a switch, router, or other communications or network equipment. In this example, the node B comprises one or more line cards 130,132 for terminating a link with another node. The node B 103 comprises common parts 134, e.g. an up link, local control, switching matrix and/or cooling.

In an example, the testing apparatus 1 comprises a traffic tester 120. The traffic tester 120 is configured to supply the test traffic load and/or measure one or more parameters of the communications equipment. As such, the traffic tester 120 is a combination of the test traffic unit 24 and measurement unit 22 described above, for at least one parameter. In particular, the traffic tester 120 both transmits a test traffic load and measures in receive one or more parameters, in particular, one or more traffic parameters, e.g. error rate, latency, jitter. Optionally, a further measurement unit (not shown) measures one or more further parameters.

In a further embodiment, the transmitting of test traffic load function of the testing and measuring function are separate, and attached to different ones of the communication equipment and node(s). For example, the testing apparatus 1 connected to the communication equipment 103 includes the measurement unit and not a test traffic unit, and the test module connected to a network node includes the test traffic unit and not a measurement unit. The testing apparatus 1 may be distributed, e.g. in two more locations or housings.

The testing apparatus 1 optionally further comprises a power consumption measurement unit 24 configured to measure the power consumption of the equipment under test, for example, as described above. The power consumption measurement unit 24 and traffic tester 120 are connected to a controller 26 configured to coordinate and correlate the measurements. The functions can be implemented as software functions running on any kind of processor.

In some examples, a connection 136 to the equipment 103 under test (e.g. to one or more modules e.g. line cards) provides information on the power management mode currently operating or on the setting or resetting (trigger) of the power management mode in the equipment under test. Optionally, the connection 136 is specifically for a module within the equipment or system under test, in order to assist the controller fully correlate the events.

The testing apparatus 1 comprises an output (not shown) configured to output the measured one or more parameter. Output data may be processed. The output data or values derived from processing may be transferred to the network management system for efficient operation of the network management system 110.

Node A and node C have the same or similar function and components as the equipment under test. Alternatively node A and/or node C have different functionality and/or components to node C.

The EA NMS 110 is connected to and controls the equipment under test node B 103. In the example shown the EA NMS is also connected to and controls one or more connected nodes, e.g. nodes A 100 and C 104. Alternatively, one or more of the connected nodes are not controlled by the EA NMS or are controlled by a separate EA NMS. Separated EA NMS can be coordinated or uncoordinated.

A traffic tester module 122 is connected to one or more of the connected nodes, e.g. node A and node C. Such traffic tester modules are controlled by the controller 26. The traffic tester module(s) 122 provide a test traffic load and/or measure one or more test parameters for the connected node and/or link. The traffic tester modules 122 may be considered as part of the testing apparatus 1.

Test Procedure

Testing of the equipment 103 comprises providing a traffic load to, from or through the equipment 103. For example, the traffic load is transmitted between the equipment under test (second node B) 103 and node A 100. The traffic is from Node A 100 to Node B 103. Traffic is also transmitted from Node A 100 and Node C 104 and from Node C 104 to Node B 103. Alternatively, the traffic may be in the opposite direction, or in both directions, and/or between only some of the nodes. The equipment under test can refer to the whole equipment 103, or only a module e.g. the line card 130 handling the first link A-B 1 101.

Figure 10:
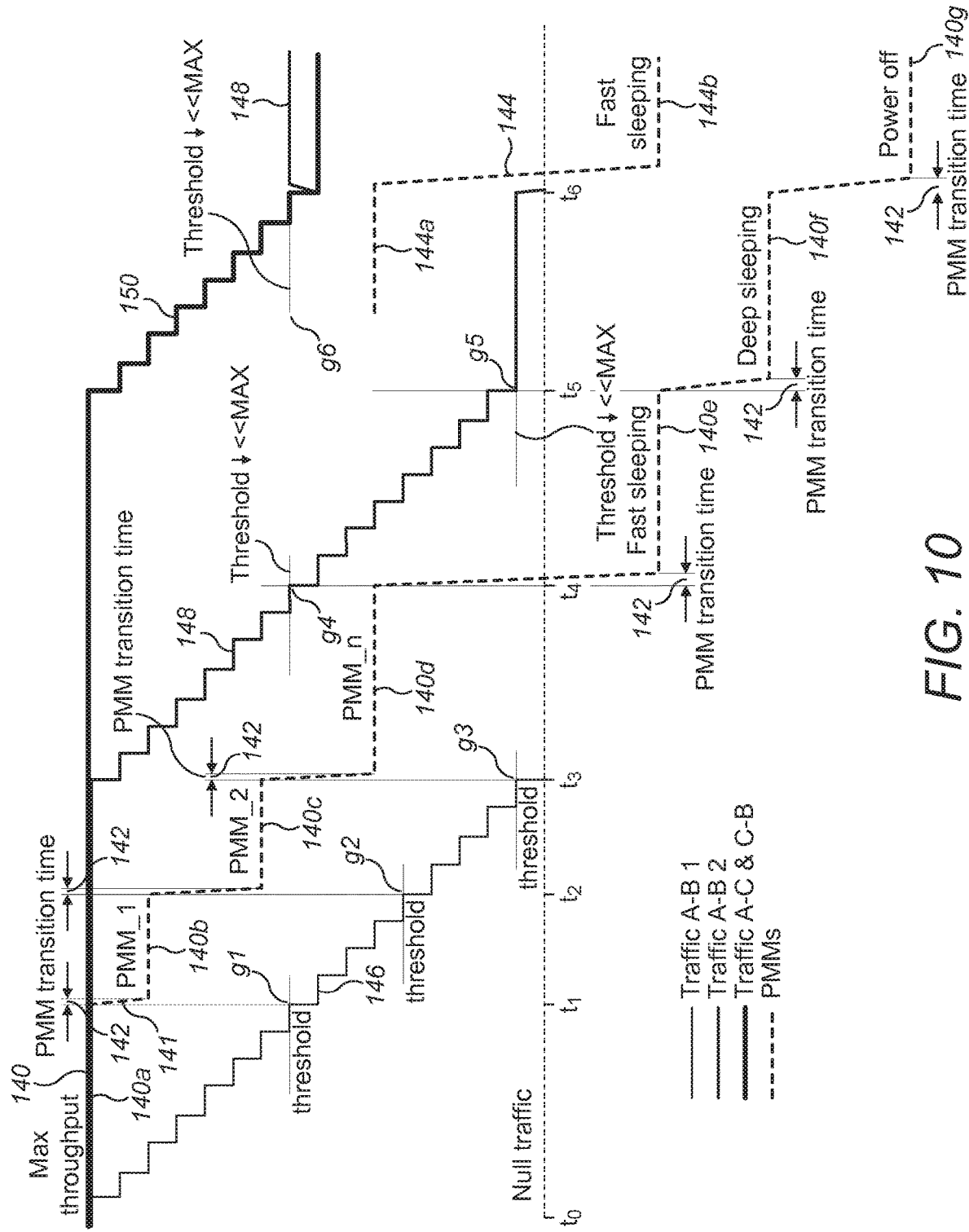
FIG. 10 shows an output traffic load of an embodiment of the testing apparatus, with a corresponding power management mode of the communications equipment under test.

FIG. 10 shows an example of the variations in test traffic load provided, and the resultant power management mode of the equipment under test. This is merely an example, and any combination of gradients can be provided by the testing apparatus 1. The testing apparatus may provide test traffic on one or more links, and for example, on a plurality of links in the network. The testing apparatus can be considered as including all distributed parts attached to any of the network elements and communications equipment 103.

The test traffic load is shown separately for each link. The first link 101 carries traffic load 146, the second link 102 carries traffic load 148, the third link 105 or fourth link 107 carry traffic load 150.

In this example, the test traffic load for all links begins at the maximum throughput level, as defined above. One or more parameters of the node 103 and/or one or more parameter at one or more further point of the network is measured.

The test traffic load decreases according to a gradient, as previously described. As an example, the decrease is initially only on the equipment under test (Node B 103). For example, the traffic load level (A-B) between Node A 100 and Node B 103 is decreased. The traffic load level 146 decreases on the first link 101 (A-B-1), and the traffic load level 148 is initially constant on the second link 102 (A-B-2). The equipment under test can be considered as a module of the equipment 103, e.g. the line card 130 handling the first link A-B 1.

The power management mode is shown by the line 140. From an initial time $t_0$, power management mode changes occur at transition times $t_1$, $t_2$ and $t_3$. The power management mode changes from initial mode 140a, which corresponds to maximum capacity and maximum power consumption.

As a result of the variation in test traffic load, the equipment under test handles changes power management mode in a transition 141. The change in power management mode occurs during the continuous period of the test traffic being transmitted and continual measurements configured to detect the effect of the transition itself. The transition 141 refers to the event of switching between any power management modes. The transition 141 refers to the actual point or period of switching power management modes, rather than merely that the power management mode is different to a previous mode.

The subsequent modes 140b,140c,140d are prompted by the change in test traffic load level on the first link 101 falling below thresholds $g_1$, $g_2$, $g_3$ respectively. The power management mode transition events require a transition time 142 to fully complete. The power management mode 140d is prompted by the reduction to zero traffic on the first link 101.

Parameters are measured to characterise the effect of each transition in test traffic load and, when occurring, transition in power management mode.

Whilst the traffic load level 146 is constant, parameters e.g. including a traffic parameter are measured, e.g. data throughput, loss of rate, PMM transition time, latency, jitter, and/or power consumption are measured at the equipment under test. For each transition in traffic load level 146, a traffic parameter e.g. the loss of rate is measured at the equipment under test (e.g. line card 130).

During the whole test, a traffic parameter, e.g. loss of rate is measured for traffic on the second link 102, third link 105 and fourth link 107. These measurements verify that no impairments are induced by the equipment under test power management, for example, during power management mode transitions.

The EA NMS typically decides on which link to transmit the traffic, and so this aspect of the function of the EA NMS is measured by the testing apparatus 1.

The test traffic signal continues with a further variation in traffic load level 148, now reducing the traffic on the second link 102 (A-B 2). In this example, the test traffic 148 is reduced with the same gradient.

The reduction in test traffic 148 on the second link A-B 2 prompts a power management mode transition at time $t_4$. The power management mode transitions into a first sleeping power management mode 140e. The first sleeping power management mode 140e is a fast sleeping mode, i.e. a return to a higher power management mode is relatively quick. The first sleeping power management mode 140e is triggered by traffic on the second link 102 falling below a threshold value $g_4$. For example, for a link maximum throughput of 10 Gb/s, the threshold value can be 1 Gb/s.

The test traffic signal continues to vary with time. The traffic level 148 on the second link 102 (A-B 2) is further decreased with the same gradient slope. The decrease in test traffic prompts the equipment under test to transition into a second sleeping power management mode 140f. The second sleeping power management mode 140f is a deep sleeping mode. The second power management mode 140f is triggered by the traffic flow on the second link 102 falling below a threshold $g_5$. For example, the threshold $g_5$ may be 100 kb/s.

The parameters measured in a sleeping power management mode may be different to those measured in other power management modes. Different parameters can be measured at modules which are sleeping to modules which are active. For example, measured at the equipment under test (e.g. sleeping module, line card 130) is the transition time of the sleeping power management mode and/or power consumption.

At the active link, e.g. second link (traffic A-B 2), a traffic parameter, e.g. the loss of rate, latency, and/or jitter are measured, for example, during the whole test.

During the whole test, a traffic parameter. e.g. loss of rate is measured for traffic on the further links of the network, third link 105 and fourth link 107. Measurements of any parameter on any of the nodes may also be made.

The power management mode may be the same or different for each of the links. For example, when the part of the equipment handling the first link 101 enters the second sleeping power management mode, the part of the equipment handling the second link is in a different power management mode 144. The power management mode 144 is initially an active power management mode 144a.

A test traffic load 150 on further links within the network 99 is subsequently reduced. In particular, the test traffic 150 on the third link 105 or fourth link 107 is reduced. The reduction is with the same gradient as previously applied.

When the test traffic load level 150 on the second and third links 102,105 falls below a threshold level $g_6$, the equipment under test is expected to re-route the residual traffic on the second link 102 through node C 104. In particular, the equipment under test is configured to route all active traffic between Node A and Node B (e.g. less than 100 Kb/s) through the Node C.

The residual traffic load 148 between Node A and Node B is shown as an addition to the traffic load 150 on the third or fourth link 105,107. The threshold level $g_6$ may be 1 Gb/s. The equipment under test (e.g. line card 130) then enters a third, deepest sleeping, power management mode 140g, e.g. Power Off. This re-routing is measured and characterized by the testing apparatus 1.

Also triggered by the test traffic load level falling below the threshold level $g_6$, the part or module (e.g. card) of the equipment 103 under test handling the second link 102 changes power management mode. The second link 102 transitions to a sleeping power management mode 144b, e.g. equivalent to the first sleeping power management mode. Parts or modules of the equipment under test handling the second link 102 transition from a power management mode 144 in an active mode 144a to a first sleeping mode 144b. The card 132 is then in a sleeping power management mode.

The following parameters are measured:

At the equipment under test: transition time of PMM and/or power consumption. For traffic on active links, e.g. traffic routed from Node A 100 to Node B 103 via Node C 104 (Traffic A-C-B), traffic parameters, e.g. the loss of rate, latency and/or jitter are measured. These measurements may be made whenever the link is active, e.g. during the whole test.

For traffic 150 between Node A 100 and Node C 104, and between Node B 103 and Node C 104, the loss of rate is measured, e.g. during the whole test.

Figure 11:
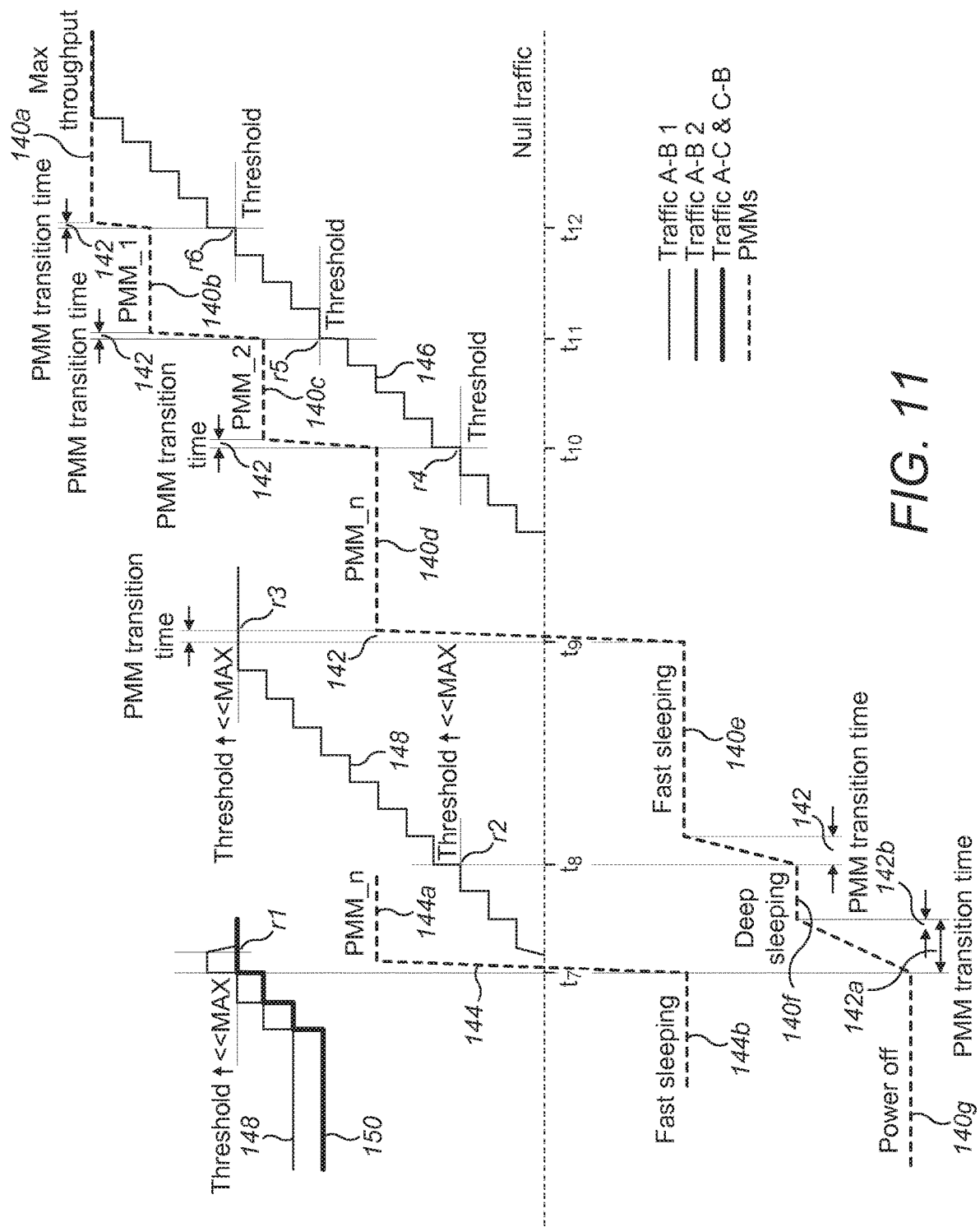
FIG. 11 shows a further output traffic load of an embodiment of the testing apparatus, with a corresponding power management mode of the communications equipment under test.

FIG. 10 also shows that the traffic from the second link 102 is added to the traffic between Nodes A and C and Nodes C and B, when the second link 102 enters a sleeping mode. Testing the Increasing Traffic Slope FIG. 11 shows a continuation of the test traffic load 148 illustrated in FIG. 10. FIG. 11 shows an increasing test traffic load, following the decreasing test traffic load of FIG. 10. Therefore, the test traffic load is a decrease along a gradient, followed directly by an increase along a gradient. In this example, the magnitude of the gradient is the same in the increase and decrease. The reference numerals and levels in FIG. 11 correspond to FIG. 10.

In this example, the test traffic load 148 increases symmetrically to the decrease. In particular, the initial increase is on traffic 150 between Node A 100 and Node C 104, and between Node B 103 and Node C 104. As the traffic 150 increases beyond threshold $r_1$, parts of the equipment under test handling the second link 102 transition from the power management mode 144 in a first sleeping mode 144b to an active mode 144a. Simultaneously, the parts of the equipment under test handling the first link 101 transition from the power management mode 140 in the third sleeping mode 140g to the second sleeping mode 140f at time $t_7$.

A transition time 142a from the third sleeping mode 140g to the second sleeping mode 140f is typically longer than any other transition time. As for all transitions, the parameters of the equipment under test are measured during and as a result of the traffic load transition and the power mode transition. A further time period 142b indicates a subsequent period in which a state of the communications equipment is still affected by the transition event. As such, the further time period 142b may occur directly after any transition between power management modes, and in some circumstances, directly after a variation in the level of the test traffic load.

The test traffic load 148 on the second link 102 increases, triggering an increase in power management mode at thresholds $r_2$ and $r_3$ (time $t_8$ and $t_9$). After the test traffic load 148 on the second link 102 reaches maximum throughput, the test traffic load 146 on the first link 101 increases up to maximum throughput. The test traffic load 146 triggers power management mode changes on rising above thresholds $r_4$, $r_5$ and $r_6$ at times $t_{10}$, $t_{11}$ and $t_{12}$ respectively. The test traffic load returns to the original maximum throughput load.

One or more parameters are recorded. For example, the same parameters are recorded as in the equivalent stage in the decreasing gradient. For example, once a module (e.g. line card 130, handling the first link 101) is active, one or more of: traffic parameters, data throughput, loss of rate, PMM transition time, latency and jitter and power consumption are measured. These parameters may not be measured until after the transition which returns the module to an active state. When the module is in a sleeping power mode, one or more of transition time of PMM and power consumption are measured. For a module of the communications equipment 103 which is not a primary module under test, e.g. for the line card 132 handling the second link 102, one or more parameters are measured comprising any mentioned parameter, and in particular, loss of rate, latency and jitter.

For a node or link connecting to the equipment under test, one or more of the parameters above is measured. For example, only loss of rate is measured, e.g. on the second, third and fourth links 102,105,107.

In the above example, traffic load is varied on only one link at a time. Alternatively, the traffic load transmitted on more than one link can be varied at the same time. Any combination of varying and static traffic loads may be provided by the testing apparatus.

Figure 12:
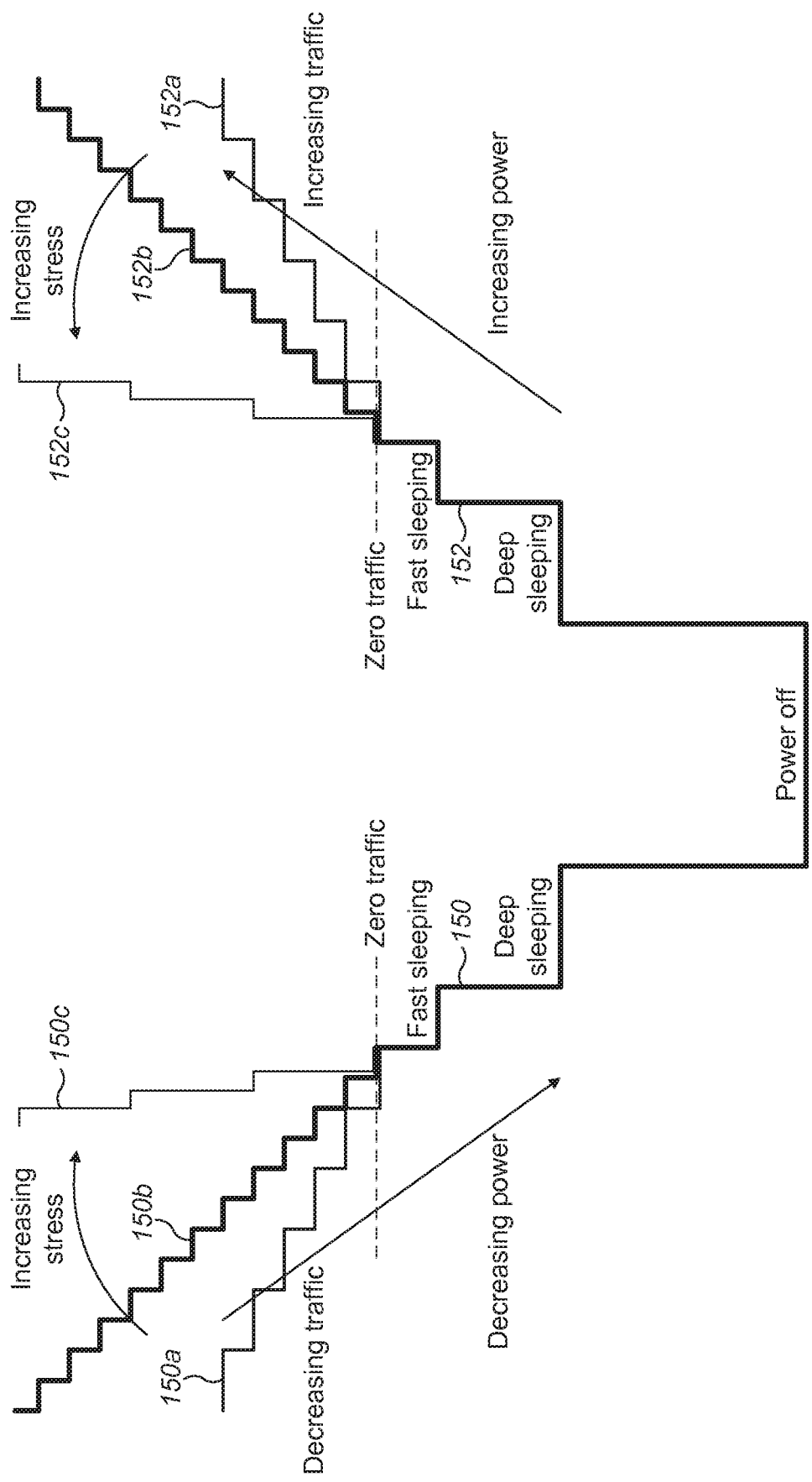
FIG. 12 shows exemplary output traffic loads of an embodiment of the test testing apparatus.

FIG. 12 shows an example of the testing of the equipment 103 continuing by re-running the example decreasing and increasing test profile. In the further one or more runs, the magnitude of the gradients can be different to the original run. For example, one or more tests are re-run on the basis of a comparison of one or more parameters compared to a threshold, e.g. the loss of rate is compared to a zero loss of rate. If the comparison of the parameter with the threshold indicates that the equipment is working well (e.g. zero loss of rate), then the test is re-run with a more stressing test traffic load.

In particular, the magnitude of a gradient of the varying test traffic load is increased. The testing apparatus 1 provides a first test traffic load 150a, 152a, a second test traffic load 150b,152b, and a third test traffic load 150c, 152c. The test traffic loads 150a,152a; 150b,152b; 150c,152c show separate test traffic loads with successively increasing magnitudes of gradient. The example test traffic gradients have a decreasing section 150a,150b,150c, followed by an increasing section 152a, 152b, 152c. In this example, a test traffic load 150,152 which triggers a sleeping power management mode of the communications equipment 103 is common to the different stress test traffic loads.

The magnitudes of the decreasing test traffic loads 150a, 150b, 150c and increasing test traffic loads 152a, 152b, 152c are both increased, for example, by the same amount. The test can be re-run a plurality of times with successively increasing stress. For example, the re-running of the test can cease on the basis of a comparison of a parameter with a threshold. Alternatively, the re-running of the test can cease when a pre-determined stress is run.

The different gradients 150a,152a; 150b,152b; 150c,152c have a range to apply to the same power management mode transition. The gradients applied have different gradient magnitudes and/or time durations to verify how the equipment under test responds. The first "relaxed" gradient 150a, 152a has a relatively low change in traffic load with time and/or over a relatively high time duration. The second test signal 150b,152b providing a traffic load gradient which is more "stressing" is applied separately. The second test signal 150b,152b can have a higher gradient and/or vary over a shorter time period.

The highest magnitude gradient and/or time duration (i.e. the most stressing third test signal 150c,152c) which is handled by the equipment under test with a parameter at or under (or above) a threshold can be determined. For example, one of the parameters which is measured is the number of errors, i.e. loss of rate. The threshold can be zero errors. Thus, the most stressing test gradient which can be handled by the equipment with no errors is recorded as a characteristic of the equipment.

In the example shown, only the test traffic load on the first link 101 is shown. The test traffic load on one or more links can also vary in stress, or are fixed. The sleeping power management modes of the equipment under test are also shown for reference.

In an optional embodiment, the further tests are re-run with less stress. For example, the gradient(s) have a lower magnitude of gradient. The less stressful test may be used on the basis of a comparison of a parameter with a threshold, e.g. if the loss of rate on the original test is higher than a threshold.

The characterization of the equipment under test can be output to the NMS 110 to allow the NMS 110 to efficiently and effectively control the equipment 103 under test. In particular, the characterized parameters, e.g. data throughput, transition time, latency and power consumption of each power management state of each connected equipment allows maximizing power saving without affecting the quality of service. For instance, by knowing how long it takes to get in and out of certain sleeping modes using the characterization provided by the testing apparatus 1, the EA NMS 110 will control the timing of the power management mode to make traffic routing at the most beneficial time. The characterization of the equipment can also be used to compare with eventual coming Standards in this field, to verify compliance.

The testing has been described as recording the measurement at a time when the equipment 103 is in a state dependent on the transition. The testing uses a traffic test load which varies whilst measurements of one or more parameters are continually recorded.

Figure 13:
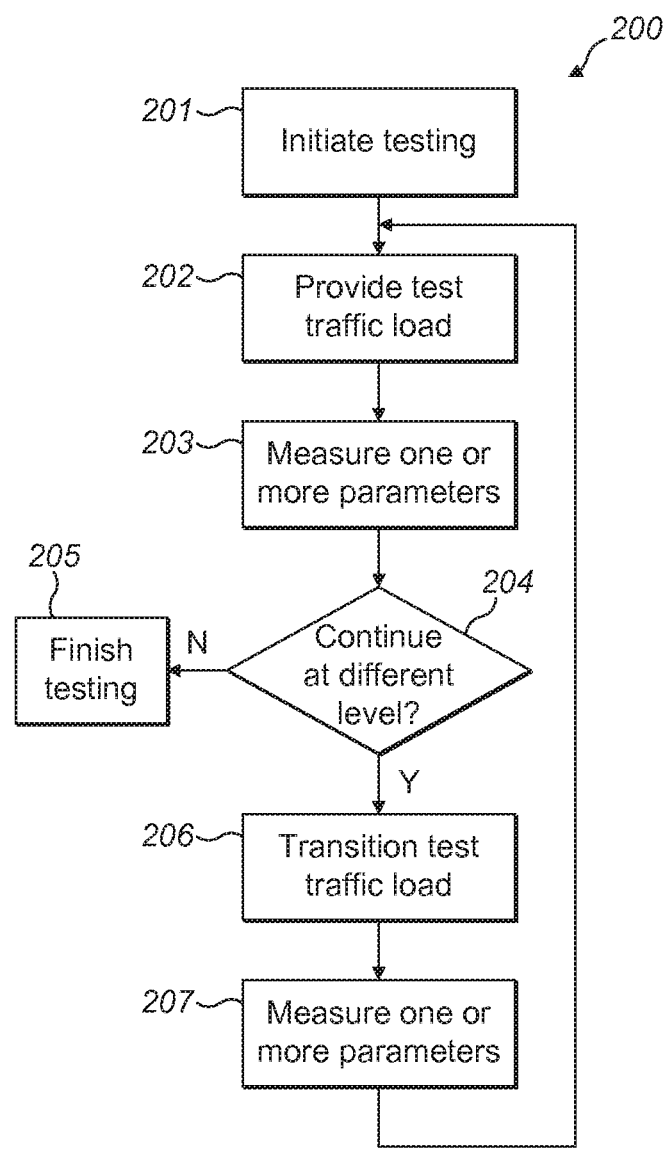
FIG. 13 shows a flow diagram of a method according to an example of the present invention.

FIG. 13 shows a method 200 in testing the communications equipment 103 or system 113 under test. After initiating the testing in 201, a test traffic load is provided to the communications equipment or connected node in 202. This test traffic load is static for a pre-determined time. In 203, one or more parameter of the communications equipment, network node or system under test is measured. Providing the test traffic load, including variations in the test traffic load, and recording the measurements occurs concurrently.

If the pre-determined testing sequence is determined to have been completed in 204, the testing finishes in 205. Otherwise, the testing continues with a transition to a different level of test traffic load, in 206. One or more parameters are measured at the time of transition, in 207. The one or more parameters measured at transition in 107 may the same or different parameters to the one or more parameters measured whilst the test traffic load is not varying. The testing continues with the test traffic load provided at the new level, and further measurement of the parameters. Alternatively, the test traffic load may start or end with a transition.

Another aspect of the invention provides a computer program on a computer readable medium and having instructions which when executed by a computer or apparatus, causes the computer or apparatus to carry out any of the method features. The apparatus can be embodied at least partially in one or more of software, firmware or hardware.

Elements or parts of the described testing apparatus, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

The one or more parameters are measured during a time in which the test traffic load varies and/or the power management mode is triggered to vary. The sampling of the measurements is arranged to be sensitive to the direct response of the equipment under test to the variation in test traffic load and/or variation in the power management mode. For example, the variation in test traffic load is within an overall time period in which measurements are recorded. The sampling time of the measurements is sufficiently small to detect variations in the state of the communications equipment due to the variation in test traffic load and/or variation in the power management mode. The testing apparatus 1 may be a stand-alone apparatus, or a part of another apparatus.

In some examples, characterizing the equipment handling a transition to a different traffic load level can be considered as characterizing the response of the equipment to the varying test traffic load, or the response to a change in test traffic load. The amount of change of test load level and/or the static time between transitions may affect the equipment under test, and be tested by the testing apparatus 1. Thus, the effect of the previous test traffic load is considered. The response to the change in test load may test the selection or thresholds of power management modes. The response to the change in test traffic load may be measured alternatively to, or separately from, a parameter (e.g. loss of rate) measured specifically in association with the actual transition event.

The characterizing the communications equipment in handling a transition of the test traffic load to the different level can be considered broadly as considering how any aspect of the equipment or system under test responds to a variation in test traffic load, for example, a gradient of test traffic load. One or more parameters are measured, and for example, correlated with the traffic load and/or selection of power management mode in response to the varying test traffic load. The testing apparatus can determine or provide information to determine energy efficiency of the equipment or system. Any of the features described may be combined with any other feature of any embodiment. Any of the method features described may be embodied as a function of an apparatus, and any apparatus feature described may be embodied as a method step.

The invention claimed is:

1. A method of testing a Network Management System configured to control a communications equipment operable in one of a plurality of power management modes, the method comprising:
   providing to said communications equipment a test traffic load which varies with time and which triggers a change to a different one of the power management modes,
   measuring one or more parameter which characterizes the power management mode of the communications equipment in handling a transition to the different power management mode, as controlled by the Network Management System, in response to the test traffic load.

2. The method as claimed in claim 1, wherein the control by the Network Management System is in response to information about the power management mode.

3. The method as claimed in claim 1, wherein the measured parameter relates to computation of traffic routing and/or controlling power management mode.

4. The method as claimed in claim 1, wherein the control by the Network Management System comprises handling routing in the network.

5. The method as claimed in claim 1, wherein the measuring comprises measuring the communications equipment in a time period in which a state of the communications equipment is dependent on the transition to a different level of the test traffic load and/or dependent on the transition between power management modes.

6. The method as claimed in claim 1, wherein the test traffic load comprises a section of increasing traffic load having a plurality of steps and/or a section of decreasing traffic load having a plurality of steps.

7. The method as claimed in claim 1, wherein the parameter comprises one or more of: loss of rate, jitter, latency, data throughput, a transition time between power management modes of the communications equipment triggered by the test traffic load and/or power consumption.

8. The method as claimed in claim 1, wherein the communications equipment is connected to one or more network nodes with one or more links to form a network, and the communications equipment is tested as part of the network and/or one or more parameters of the link(s) and/or node(s) is measured.

9. The method as claimed in claim 1, wherein the communications equipment is connected with a plurality of links to one or more network node, wherein the test traffic load is configured to vary to test the communications equipment routing the test traffic load between different links, and optionally, one or more parameter is measured for each of the plurality of links.

10. The method as claimed in claim 1, wherein the communications equipment is connected with a plurality of network nodes, wherein the test traffic load is configured to vary to test the communications equipment routing the test traffic load on an alternate path between the network nodes and/or communications equipment.

11. A testing apparatus for testing a Network Management System configured to control a communications equipment operable in one of a plurality of power management modes, the testing apparatus comprising:
   a test traffic unit configured to provide to the communications equipment a test traffic load which varies with time and which triggers a change to a different one of the power management modes, and
   a measurement unit configured to measure one or more parameter which characterizes the power management mode of the communications equipment in handling a transition to the different power management mode, as controlled by the Network Management System, in response to the test traffic load.

12. The testing apparatus as claimed in claim 11, wherein the measurement unit is configured to measure the communications equipment in a time period in which a state of the communications equipment is dependent on the transition to a different level of the test traffic load and/or dependent on the transition between power management modes.

13. The testing apparatus as claimed in claim 11, wherein the testing apparatus is configured to characterise communications equipment connected with a plurality of links to one or more network node, wherein the test traffic unit is configured to provide a test traffic load configured to vary to test the communications equipment routing the test traffic load between different links, and optionally, the measurement unit is configured to measure one or more parameter for the plurality of links.

* * * * *